United States Patent

[11] 3,565,224

| [72] | Inventor | William Argereu<br>Hickory Drive, Pole 4, North Scituate, R.I. 02857 |
|---|---|---|
| [21] | Appl. No. | 770,661 |
| [22] | Filed | Oct. 25, 1968 |
| [45] | Patented | Feb. 23, 1971 |

[54] CENTRIFUGAL CLUTCH
6 Claims, 8 Drawing Figs.

[52] U.S. Cl. ................................................. 192/105
[51] Int. Cl. ....................................... F16d 43/18
[50] Field of Search........................................... 192/103
(B), 104B, (.C), 105 (B-1)

[56] References Cited
UNITED STATES PATENTS
1,683,954  9/1928  Carrey........................... 192/105B-1
2,283,325  5/1942  Fawick........................... 192/105B-1

FOREIGN PATENTS
634,880  9/1936  Germany..................... 192/105(B-1)
611,190  10/1948  Great Britain................ 192/105(B-1)
348,823  6/1937  Italy............................. 192/105(B-1)
785,738  11/1955  Great Britain................ 192/105(B-1)

Primary Examiner—Douglas Hart
Attorney—Barlow and Barlow

ABSTRACT: A centrifugal clutch having weights embedded in a resilient medium usually molded about the weights and which medium is sufficiently resilient so that the weights will radially expand the resilient medium under the influence of centrifugal force into engagement with the surface to be driven.

INVENTOR
WILLIAM ARGEREU
BY
Barlow & Barlow
ATTORNEYS

CENTRIFUGAL CLUTCH

BACKGROUND OF THE INVENTION

Centrifugal clutches often embody spider-like forms in which weights are guided, such, for example, as in U.S. Pat. No. 3,171,524, dated Mar. 2, 1965, with some resilient means such as a spring to control their outward movement or to cause inward movement of the weights until sufficient centrifugal force is developed by rotation to cause the weights to move outwardly.

SUMMARY OF THE INVENTION

This centrifugal clutch has a resilient body formed of a resilient rubberlike substance or polyurethane in which blocklike metallic weights are embedded, the body being sufficiently resilient to permit the weights to force the resilient body outwardly thereby radially expanding it due to the centrifugal force of the weights within it.

DESCRIPTION OF THE PREFERRED EMBODIMENT

Figure 1:
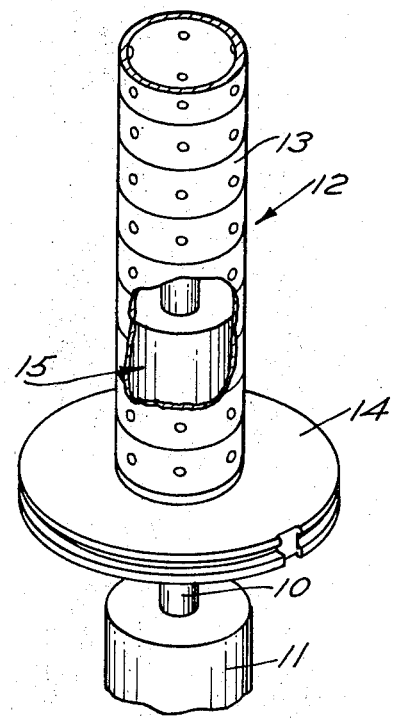
FIG. 1 is a perspective view illustrating a bobbin on a spindle and broken away to show the centrifugal clutch within the core of the bobbin.

In the drawings 10 designates a spindle extending from a hub portion 11 upon which a bobbin designated generally 12 is mounted for rotation. This bobbin has a tubular core 13 and a head 14 which is adapted to rest upon the hub 11. Yarn is adapted to be wound upon this bobbin. In order to secure the bobbin for rotation with the spindle, a clutch 15 is secured to the spindle and in order that the bobbin may be easily removed from the spindle when it is stopped the clutch used is an automatic or centrifugal type of clutch which will grip the bobbin core when rotating but when the spindle stops rotating the bobbin will be free to be removed and replaced by another bobbin as desired.

The clutch designated generally 15 comprises a cylindrical sleeve 16 which is split at its opposite ends as at 17 at diametrically opposite points with the splits at the opposite end disposed at 90° to each other. A collar 20 embraces the split portion of the sleeve at each of its upper and lower ends and is provided with radial threaded openings 21 and 22 which receive the screws 23 and 24 engaging a flattened portion of the sleeve for contracting the split portion of the sleeve at its upper and lower ends so as to bind the sleeve upon a spindle such as 10.

A plurality of blocklike weights, shown as three in number, are designated 25 and are generally arcuate in shape having an inner curvature 26 substantially that of the sleeve and a generally parallel circular outer surface 27. About midway between the upper and lower ends of these blocklike weights 25, there is a recess 28 in which there is located a fixed diameter ring 29, largely for safety purposes, to prevent the weights from flying away should excessive speeds happen to be encountered. These recesses 28 extend in sufficiently so that the weights may move radially outwardly a sufficient extent to permit the desired action of the weights in the clutch.

Figure 2:
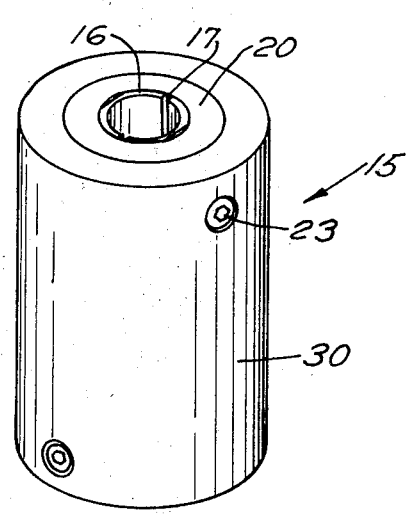
FIG. 2 is a perspective view of the clutch disassembled from the spindle on which it is to mounted.
Figure 3:
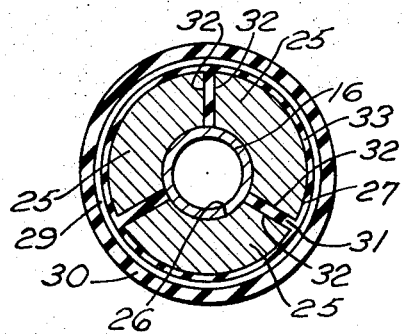
FIG. 3 is a lateral section through substantially the center of the clutch.
Figure 4:
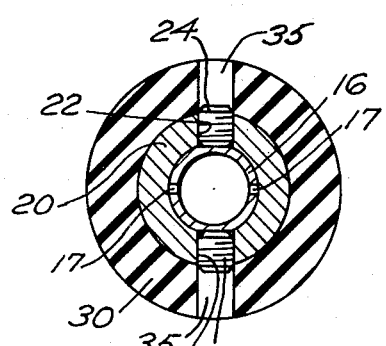
FIG. 4 is a lateral section through one end of the clutch showing a means for securing the same to the spindle.
Figure 5:
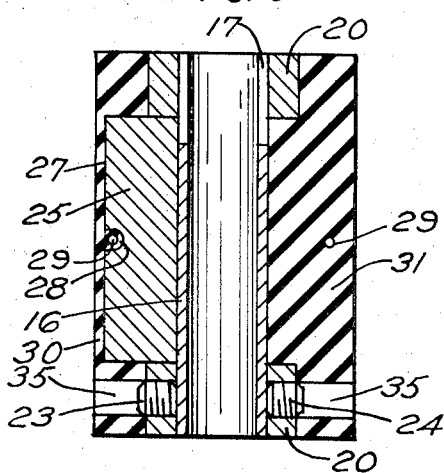
FIG. 5 is a central longitudinal sectional view through the clutch.

A body 30 of a resilient material such as poluyrethane, rubber or synthetic rubber having sufficient resiliency to permit the weights to expand is molded about the weights and the ring 29 which provides a circular cylindrical finished clutch as seen in FIG. 2 with the resilient material extending inwardly in the form of radial ribs 31 between the edges 32 of the weights 25 and also surrounding the weights as at 33 in a continuous cylindrical surface. As the molding occurs of the resilient material about the weights and the ring 29, plugs are provided so that openings as at 35 are formed for access to the screws 23 and 24 for clamping the sleeve onto the spindle.

Figure 6:
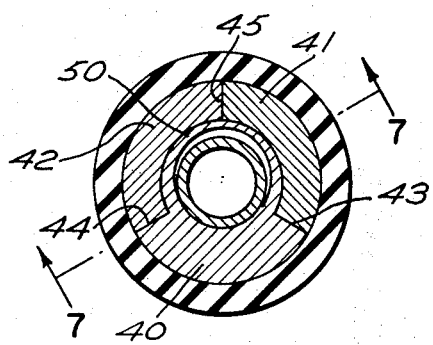
FIG. 6 is a section on line 6-6 of FIG. 7 of a modified form of weight construction.
Figure 7:
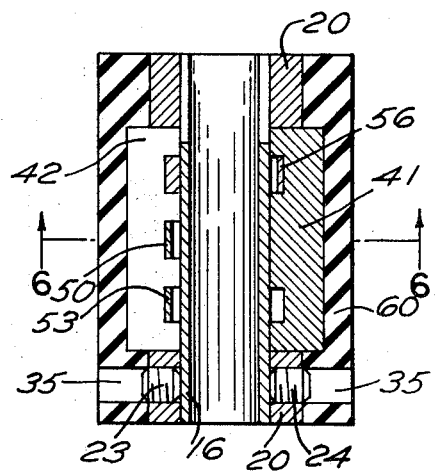
FIG. 7 is a section on line 7-7 of FIG. 6 of the modified form.
Figure 8:
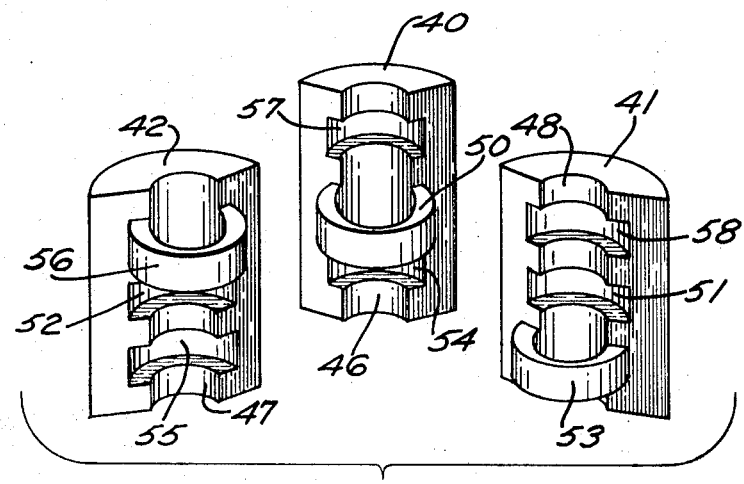
FIG. 8 is an exploded perspective view of the three weights of the modified form.

In FIGS. 6—8 the three blocklike weights 40, 41, 42 are arcuate in shape as above described each of an arc of 120° but differ in that in contracted position their opposite edges contact in the three locations 43, 44, 45. Further, their inner surfaces 46, 47, 48 which fit about the cylindrical sleeve 16 are provided with a pair of recesses to receive rings to limit expansion of the blocks under centrifugal force.

The weight 40 has a ring 50 midway between its upper and lower ends of a size to loosely receive the sleeve 16 and is received in recesses 51 in weight 41 and in recess 52 in ring 42. The weight 41 has a similar ring 53 but at its lower portion to loosely receive the sleeve 16 and is received in recess 54 in weight 40 and in recess 55 in weight 42. The weight 42 has a ring 56 at its upper portion to loosely receive the sleeve 16 and is received in recesses 57 in weight 40 and in recess 58 in weight 41. Weights 41 and 42 are identical but are turned end for end.

A body of resilient material 60 as before set forth embraces the weights and the rings 20 which clamp the clutch on to the spindle and the weight will be limited in their outward movement under the action of centrifugal force by the rings 50, 53 and 56 with no interference from the resilient material as the weights are free to expand up to their limiting rings.

In this manner the various parts are held in position by the resilient body all in a manner so that when the spindle and clutch rotate up to a certain number revolution per minute the weights will move outwardly and expand the resilient body into engagement with the inner surface of the core 13 of the bobbin and hold it firmly so as to rotate with the spindle, whereas when the spindle stops the rubberlike material which as been expanded will contract the weights toward the sleeve, thus freeing the bobbin for easy removal from the spindle.

I claim:

1. A centrifugal clutch comprising a sleeve, means to secure the sleeve to a spindle, a plurality of weights, an integral resilient body surrounding said weights circumferentially and extending over the opposite ends thereof to axially position said weights, said body being sufficiently radially resilient to be expanded radially by the centrifugal force of the weights thereon as said body is rotated and rigid means to limit the outward radial movement of said weights.

2. A centrifugal clutch as in claim 1 wherein said weights are symmetrically arranged.

3. A centrifugal clutch as in claim 1 wherein the means is a ring on each weight.

4. A centrifugal clutch as in claim 1 wherein the means is a ring on each weight with recesses on the cooperating weights to receive it.

5. A centrifugal clutch as in claim 3 wherein the means is a ring in said body and located circularly about said weights.

6. A centrifugal clutch as in claim 3 wherein said weights are recessed and a portion of a ring on one weight is located in the recess of another weight.